Figure 1:
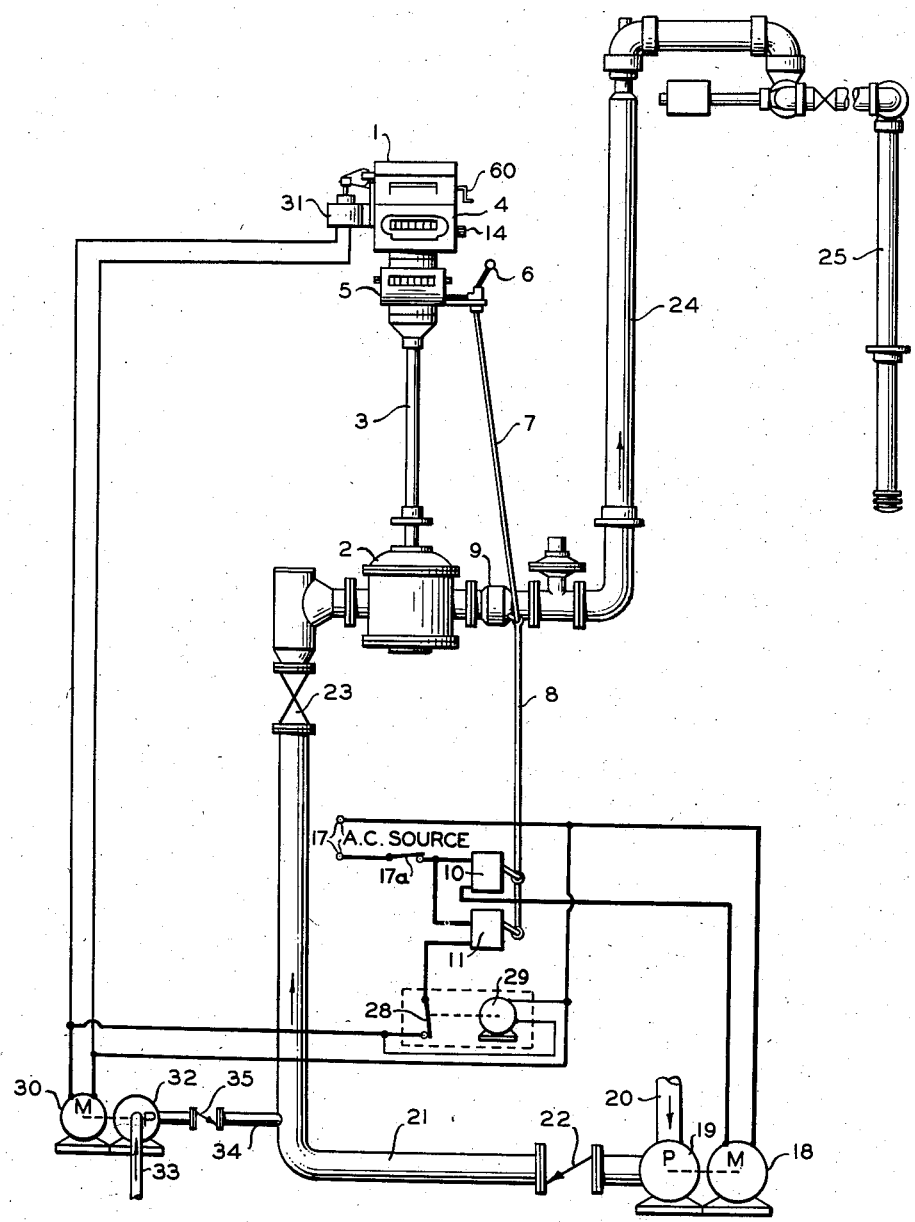

Feb. 3, 1959

E. E. REED 2,872,072

CONTROL SYSTEM

Filed May 16, 1955

2 Sheets-Sheet 1

INVENTOR.
E. E. REED
BY *Hudson + Young*

ATTORNEYS

Feb. 3, 1959

E. E. REED 2,872,072

CONTROL SYSTEM

Filed May 16, 1955

2 Sheets-Sheet 2

INVENTOR.
E. E. REED
BY Hudson + Young
ATTORNEYS

United States Patent Office 2,872,072
Patented Feb. 3, 1959

2,872,072

CONTROL SYSTEM

Edwin E. Reed, Bartlesville, Okla., assignor to Phillips Petroleum Company, a corporation of Delaware Application May 16, 1955, Serial No. 508,665

4 Claims. (Cl. 222—30)

This invention relates to a meter printing device. In one embodiment, this invention relates to a printing device having an indicator showing that an additive has been incorporated.

In the shipment of liquids in bulk or the withdrawal of liquids from bulk storage, frequently an additive is incorporated in part of the liquid and not in other portions. The liquid so withdrawn is frequently metered and the amount withdrawn printed on a ticket or sales slip. Examples of such additive additions include gasoline supplied by a common source to certain specifications. One customer will require the additive while another customer will not, otherwise the gasoline is the same. Other examples include antifreeze addition, inhibitors, anti-oxidants, etc. When an additive is used, it is incorporated automatically in the proper ratio. However, when a liquid is being withdrawn from a common tank and some of said liquid requires the additive and some does not, there is frequently a question as to whether the additive has actually been incorporated.

An object of this invention is to provide a printing device which indicates an additive has been incorporated.

Another object of this invention is to provide a means of detecting an additive addition to a metered liquid.

Other objects, advantages and features of this invention will be apparent to those skilled in the art having been given this disclosure.

Broadly, this invention comprises a printing element activated by a solenoid so as to print a notation on a meter ticket whenever the additive pump is activated.

This invention can be illustrated by the injection of an additive into gasoline. In one such system, the additive injection involves the use of a timer which controls the additive pump motor. The amount of additive injected is controlled by a time set on the timer. The time set is generally arranged to inject all of the additive in less time than is required to pump the gasoline. The additive control system without the additive printing element comprises a switch on a set stop mechanism and an electric timer controlling an additive pump motor all connected in series. In operation, the timer is set to deliver a predetermined quantity of additive. When the set stop mechanism lever is moved to start the loading, the circuit is completed and the gasoline pump motor and the additive pump motor are started. At the end of the required time to add the proper amount of additive, the timer opens the circuit stopping the injection of additive. When the desired amount of gasoline has been delivered, the set stop mechanism breaks the circuit and stops the delivery of gasoline. In this embodiment of my invention, a solenoid is connected in parallel with the additive motor, thus any time the additive motor is started, the solenoid is energized. The solenoid, through a suitable mechanism, moves a printing element in a printer into position to print. This printing element is held in this position by a suitable dog. When the printer is activated so as to print at the end of the loading operation, the dog, through a suitable mechanism, is made to release the printing element allowing it to return to the original non-printing position.

Those skilled in the art will understand that this system can be used for adding materials to liquids other than gasoline or by using a plurality of printing elements, this system can be used for more than one additive. When more than one additive is involved, each printing element will have an identifying mark and will be associated through a separate solenoid with a particular additive pump motor.

Figure 2:
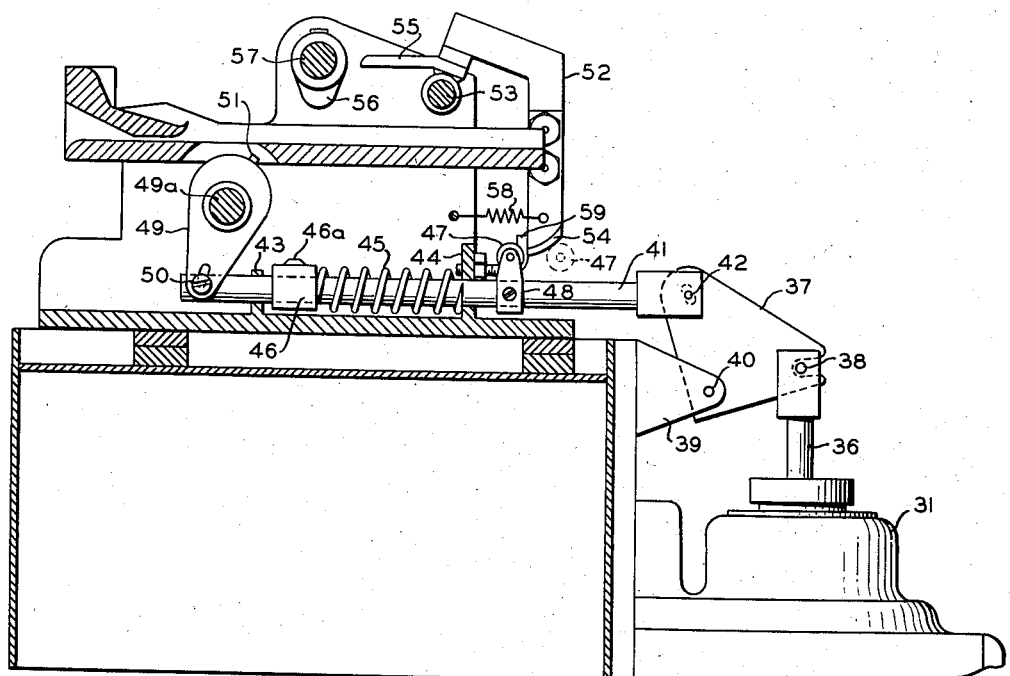
Figure 3:
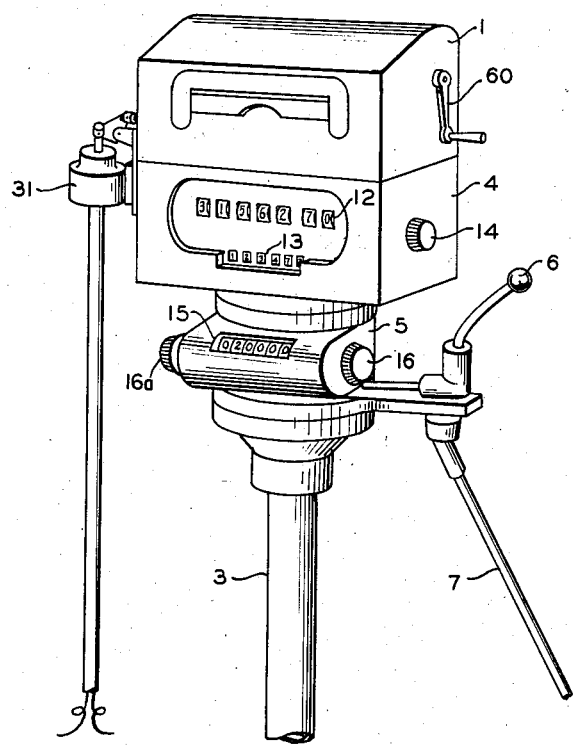

I will further describe this invention by referring to the drawings which show an embodiment of this invention wherein an additive is being injected into gasoline and wherein:

Figure 1 is an elevation view showing the arrangement of the printer, set stop mechanism, timer and wiring of an embodiment of this invention wherein an additive is injected into gasoline, Figure 2 is a view partially in section of the printer, and Figure 3 is a perspective view of the set stop mechanism and the printer.

Referring to the drawings and particularly Figure 1, a printer 1 of conventional design, but modified, as is discussed in conjunction with Figure 2 is connected to fluid meter 2 through shaft 3. Also connected to the meter through the shaft are meter indicator 4 and set stop mechanism 5. As shown, the printer, the meter indicator and the set stop mechanism are geared together, however, each could be separately connected to the flow meter. Control lever 6 of set stop mechanism 5 is connected by rods 7 and 8 to valve 9 and switches 10 and 11. Indicator 4 has a resettable dial 12 and an accumulative dial 13. Resettable dial 12 is controlled by knob 14. The set stop mechanism has a dial 15 which is set for the volume desired by knobs 16 and 16a. When switch 10 is closed, the A. C. source 17 is connected through master switch 17a to motor 18 which is connected to drive pump 19. Pump 19 moves the liquid from a source not shown through conduits 20 and 21, check valve 22 and normally open valve 23 through meter 2, valve 9 and conduit 24 to loading nozzle 25.

When switch 11 is closed, the A. C. source 17 is connected to timer switch 28 through switch 17a and when this switch is closed, the circuit is completed to time switch motor 29, motor 30 and solenoid 31. In order to show solenoid 31 in Figures 1 and 3, it has been set out to the side of the printer 1. Generally, the solenoid will be located as shown in Figure 2.

The time motor 29 has a control calibrated in volume and said motor is so connected to switch 28 that it opens that switch when the desired volume has been delivered. Motor 30 is connected to drive pump 32 which delivers a fluid from a source not shown through conduits 33 and 34 to conduit 21. Valve 35 in conduit 34 is a check valve preventing back flow.

Solenoid 31 is connected to a printing wheel 49 in printer 1 to cause it to move into the printing position when said solenoid is activated. This is shown in Figure 2.

Referring now to Figure 2, solenoid 31 is provided with actuating rod 36. A bell crank 37 is pivoted to rod 36 by pin 38, to support bracket 39 by pin 40 and to actuating rod 41 by pin 42. Actuating rod 41 is slidably supported in guides 43 and 44 and is urged to the left in the figure by compression spring 45 confined by the guide 44 and collar 46 which is attached to actuating rod 41 by set screw 46a. A roller 47 is attached to actuating rod 41 by roller bracket 48. Actuating rod 41 is pivoted to type-carrying disc 49 by pin 50. Type-carrying disc 49 is free to rotate on shaft 49a and carries printing type 51. Release lever 52 is free to rotate on shaft 53 and includes a cam surface 54 at one end and a projection 55 at the opposite end. Release cam 56 is attached to actuating shaft 57. A tension spring 58 urges release lever 52 clockwise around shaft 53 against release lever stop 59. Actuating shaft 57 can be rotated by means of crank 60 (see Figure 3) which is attached thereto.

In operation, when solenoid 31 is actuated by actuating control lever 6 when time switch 28 is closed, rod 36 is pulled downward thus rotating bell crank 37 clockwise around pin 40, moving actuating rod 41 to the right and rotating type-carrying disc 49 counterclockwise around shaft 49a to move printing type 51 to a vertical position in which position it prints an identifying character on the ticket (not shown) when shaft 57 is rotated by crank 60. When actuating rod 41 moves to the right, roller 47 forces release lever 52 counterclockwise around shaft 53 until it passes beneath cam surface 54 at which time spring 58 returns release lever 52 to the position shown leaving the roller 47 in the position indicated by the dotted lines, thus maintaining rod 41 to the right and printing type 51 in printing position after solenoid 31 is de-energized. When shaft 57 is rotated to print the ticket, cam 56 engages projection 55 after the printing operation is completed. This rotates release lever 52 counterclockwise thus allowing compression spring 45, acting against collar 46, to return actuating rod 41 and the remainder of the mechanism to the position shown. The apparatus is now ready for a complete new cycle of operation.

The printer is also equipped with printing elements on shaft 49a which are geared to the printing meter so as to be activated by the meter and prints the number of gallons registered when the crank 60 is rotated. This printer can be of the type wherein the printing elements return to zero after printing or the ticket can be printed once before starting the pump and once after the delivery is made.

In the operation of the apparatus a ticket is inserted in the printer 1 and is imprinted with numerals (gallons) at the beginning of the cycle. If this printer is the type which is returned to zero after the printing of the preceding gallons delivered, this printing step can be eliminated. After the ticket is inserted, the time motor 29 is set for the desired total gallons of gasoline to be delivered, the switch 28 closed and the set stop mechanism set to deliver the total gallons of gasoline desired. Control lever 6 is then moved to the operating position opening valve 9 and closing switches 10 and 11. When these two switches are closed, the circuit is completed to motors 18, 29 and 30 and to solenoid 31. The solenoid 31 is activated causing the element 51 to be pulled into place as is described in conjunction with Figure 2 (supra). Motor 18 drives pump 19 pumping gasoline via conduits 20 and 21 through meter 2 and on to loading nozzle 25 via conduit 24. The meter 2 activates set stop mechanism 5 and indicating meter 4 and the numerical elements of printer 1. At the same time, motor 30 drives pump 32 so as to pump additive to the gasoline stream in conduit 21 via conduits 33 and 34. The pump 32 is of such capacity that all of the additive is added in less time than is the gasoline, and therefore, timer motor 29 completes its cycle prior to set stop mechanism 5. When timer motor 29 reaches the end of the timed cycle, switch 28 is opened breaking the circuit to the timer motor, motor 30 and solenoid 31. Motor 18 and pump 19 continue to operate until the total gasoline desired as set on set stop mechanism 5 is delivered. At this point, the control lever 6 is pushed by said mechanism to the off position thereby opening switches 10 and 11 and closing valve 9. When the solenoid 31 is deactivated, the rod 36 drops back into the original position but the printing element is held in place by cam surface 54 as described (supra). At the end of the gasoline pumping cycle, crank 60 is turned printing the ticket and releasing the printing element 51 which returns to its original position. The apparatus is now ready for the next shipment.

When it is desired to load out gasoline without additive the same procedure is followed except switch 28 is not closed. In this case, no additive is pumped and the element 51 is not brought into the printing position.

This invention has been described in terms of one of its preferred embodiments wherein an additive is admixed with gasoline. Those skilled in the art will see many applications having been given this disclosure. It is also within the scope of this invention to have a plurality of printing elements on the shaft 49a each activated by an associated solenoid.

I claim:

1. A control system for indicating an additive addition to a liquid being pumped, said system comprising in combination, pumping means for pumping said liquid, conduit means for conveying the pumped liquid, means for driving said pump, pumping means for said additive, conduit means for conveying said additive, means for driving last said pumping means, a flow meter in said means for conveying said liquid, a printing means operably connected to said flow meter so as to indicate volume of flow through said meter when said printing means is made to print, a printing element in said printing means normally in the non-printing position, a solenoid operably connected to said printing element to bring it into the printing position when said solenoid is activated, means for holding said printing element in said printing position, means for returning said printing element to the non-printing position when said printing means has been made to print, a time switch, a time motor operably connected to said time switch to open said time switch when said time motor is activated for a predetermined time, means for activating said means for driving said liquid pumping means and, when said time switch is closed, for activating said means for driving said additive pumping means, said time motor, and said solenoid.

2. An improved apparatus for loading gasoline and an additive comprising in combination a gasoline pump, an additive pump, a flow meter, a loading nozzle, an inlet to said gasoline pump, conduit means connecting the outlet of said gasoline pump to the inlet of said flow meter, a conduit means connecting the outlet of said additive pump to said conduit means connecting the outlet of said gasoline pump to inlet of said flow meter, a conduit means connecting the outlet of said flow meter to said nozzle, a printing device adapted to receive a loading ticket operably connected to said flow meter so as to print on said ticket a numeral indicative of the volume of liquid passing through said flow meter, a printing element in said printing device, means for holding said printing element in the non-printing position, a solenoid operably connected to said printing element to move said printing element into the printing position when said solenoid is activated, a time switch, power means operably connected to said time switch to open said time switch after said power means has been activated for a predetermined time, means for driving said gasoline pump, means for activating said means for driving said gasoline pump and, when said time switch is closed, for activating said means for driving said additive pump, said power means for opening said time switch, and said solenoid.

3. A control system for making additive additions to a liquid being pumped, said control system comprising in combination means for pumping said liquid, means for pumping said additive to the liquid stream being pumped by first said pumping means, a flow meter in the resulting liquid stream, a printing device operably responsive to said flow meter to register flow through said meter when said printing device is made to print, a separate printing element rotatably mounted in said printing device, means for rotating said separate printing element to the non-printing position, means for rotating said printing element into the printing position responsive to activation of said means for pumping said additive, means for holding said printing element in said printing positon, and means for releasing said holding means responsive to printing by said printing device.

4. A control system for making additive additions to gasoline, said control system comprising in combination means for pumping said gasoline; means for pumping additive to the gasoline stream being pumped by said means for pumping gasoline; a flow meter in the resulting liquid stream, a printing device adaptable to receive and print on a ticket operably connected to said flow meter to register and print on said ticket numerals indicative of the volume of liquid passing through said flow meter; a printing element indicative of an additive rotatably mounted in said printing device; means for rotating said printing element to the non-printing position; means for bringing said printing element into the printing position responsive to activation of said means for pumping additive; means for holding said printing element in the printing position; means for releasing said printing element responsive to printing by said printing device; a time switch; power means operably connected to said time switch to open same when said power means has been activated for a predetermined time; means having an on and off position for activating, when in the on position, said means for pumping gasoline and, when said time switch is closed, for activating said means for pumping additive, said power means connected to said time switch and said means for bringing said printing element into the printing position; and a set stop mechanism operably connected to said flow meter and operably connected to said means having an off and on position so as to return last said means to the off position when a predetermined flow has passed said flow meter.

References Cited in the file of this patent

UNITED STATES PATENTS

| | | |
|---|---|---|
| 920,089 | Selah | Apr. 27, 1909 |
| 1,122,605 | Kettering | Dec. 29, 1914 |
| 1,969,360 | Daley | Aug. 7, 1934 |
| 2,024,480 | Short | Dec. 17, 1935 |
| 2,239,060 | Sloan | Apr. 22, 1941 |
| 2,250,326 | Carroll | July 22, 1941 |
| 2,554,296 | Crews | May 22, 1951 |
| 2,593,894 | Klopfenstein | Apr. 22, 1952 |
| 2,612,304 | Nissen | Sept. 30, 1952 |